United States Patent [19]

Snow et al.

[11] Patent Number: 5,204,438

[45] Date of Patent: Apr. 20, 1993

[54] SILICONE MACROMERS AND THERMOPLASTIC FLAME RETARDANT SILICONE-POLYPHENYLENE ETHER GRAFT COPOLYMERS OBTAINED THEREFROM

[75] Inventors: Kevin M. Snow, Clifton Park; James E. Pickett, Schenectady; Larry N. Lewis, Scotia, all of N.Y.

[73] Assignee: General Electric Company, Schenectady, N.Y.

[21] Appl. No.: 820,823

[22] Filed: Jan. 15, 1992

Related U.S. Application Data

[63] Continuation of Ser. No. 455,122, Dec. 22, 1989, abandoned.

[51] Int. Cl.⁵ .............................................. C08G 77/46
[52] U.S. Cl. ...................................... 528/25; 528/29; 528/15; 528/19
[58] Field of Search ................ 528/25, 29; 525/393, 525/474; 556/449

[56] References Cited

U.S. PATENT DOCUMENTS

| | | | |
|---|---|---|---|
| 3,306,874 | 2/1967 | Hay | 528/29 |
| 3,522,326 | 7/1970 | Bostick et al. | 528/29 |
| 3,539,655 | 11/1970 | Strachan | 525/474 |
| 3,579,467 | 5/1971 | Brown, Jr. | 556/449 |
| 3,668,273 | 6/1972 | Krantz | 528/29 |

FOREIGN PATENT DOCUMENTS

| | | |
|---|---|---|
| 0240095 | 1/1987 | European Pat. Off. |
| 369376 | 11/1989 | Fed. Rep. of Germany |
| 290806 | 4/1988 | France |
| 61-252214 | 11/1986 | Japan |
| 1-185327 | 7/1989 | Japan |
| 1232394 | 5/1971 | United Kingdom |

OTHER PUBLICATIONS

Polymerization of Poly(dimethylsiloxane)Macromers: 1. Copolymerization With Styrene-G. Gordon Cameron & M. S. Chisholm. Polymer, 1985, vol. 26, Mar., pp. 437-442.

Viscoelastic Properties of Poly(phenylene ethers). II. 2-Methyl-6-alkyl-Substituted Polymers, B. Cayrol et al—J. Polym. Sci., Pact C, No. 35, (1971) pp. 677-682.

Anionic Graft Polymerization of Lithiated Poly(2-,6-dimethyl-1,4-phenylene Ether), A. J. Chalk & T. J. Hoogeboom-J. Polym. Sci. Part A-1, vol. 7, 2537-2545 (1969).

Hydrosilylation of cardanol by Methyldichlorosilane-Application to the Synthesis of New Silicone Grafted Phenolic Resins, J. P. Pillot et al.-Eur. Polym. J. vol. 25, No. 3, pp. 285-289 (1989)-Printed in Great Britain.

Oxidative Polymerization of Phenols Having Trimethylsilyl Groups. S. H. Hyun et al.-Polymer Bulletin 16-(1986) pp. 395-400.

Primary Examiner—Ralph H. Dean, Jr.
Attorney, Agent, or Firm—William A. Teoli; William H. Pittman

[57] ABSTRACT

A silicone cyclic, such as hexaorganotrisiloxane is lithiated with an alkyl lithium compound followed by treatment with a diorganohalosilane to produce a polydiorganosiloxane having a terminal diorganohydridesiloxy unit. The platinum catalyzed addition of a 2-alkenyl-6-organophenol results in the production of a phenol-siloxane macromer. Conversion of the phenol-siloxane macromer to a silicone polyphenylene ether graft copolymer is effected by oxidatively coupling the 2,6-diorganophenol to the phenol-siloxane macromer.

6 Claims, No Drawings

SILICONE MACROMERS AND THERMOPLASTIC FLAME RETARDANT SILICONE-POLYPHENYLENE ETHER GRAFT COPOLYMERS OBTAINED THEREFROM

This application is a continuation of application Ser. No. 07/455,122, filed Dec. 22, 1989, now abandoned.

BACKGROUND OF THE INVENTION

The present invention is directed to silicone macromers, which can be made by the organolithiation of an organosilicon cyclic, the end capping of the resulting lithiated organosilicon polymer with a silicon hydride followed by the addition onto the silicon hydride of an aliphatically unsaturated monohydric phenol. More particularly, the present invention relates to the synthesis of thermoplastic flame retardant silicone-polyphenylene ether graft copolymers by oxidatively coupling a monohydric phenol with the aforementioned monohydric phenol end capped silicone macromer.

Prior to the present invention, as shown by Bostik, U.S. Pat. No. 3,522,326, graft copolymers of polyphenylene ether were made by metallating a polyphenylene ether with an organoalkali metal which was reacted with an anionically polymerizable monomer. Organopolysiloxane-polyphenylene ether block copolymers are shown by Kranz, U.S. Pat. No. 3,668,273, involving the reaction between hydroxy terminated polyphenylene ether segments with amine terminated polydiorganosiloxane segments. Another silicone-polyarylene ether block copolymer is shown by Shea, et al. U.S. Pat. No. 4,814,392, which can be made by effecting reaction between an amine terminated polydiorganosiloxane and anhydride functionalized polyarylene ether.

Polyphenylene ether graft copolymers are shown by Chalk et al, Journal of Polymer Science Vol. 7, 2537–2545, p 7345–742 (1969). An investigation of the viscoelastic properties of polyphenylene ethers, and 2-methyl-6-alkyl-substituted polymers is shown by Eisenberg et al Macromolecules 5, p. 676–682 (1972). Polymerization of polydimethylsiloxane macromers with small monomers to make graft copolymers is shown by Cameron et al, Polymer, 1985, Vol. 26, March, p. 437–442. In addition, certain silicon containing graft copolymers, useful as gas-separation membranes are shown by JP61,252,214.

SUMMARY OF THE INVENTION

The present invention is based on the discovery that a phenol-siloxane macromer having the formula,

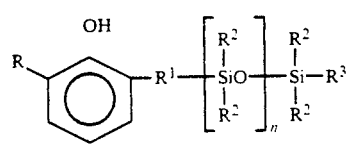

can be oxidatively coupled with a 2,6-diorganophenol having the formula,

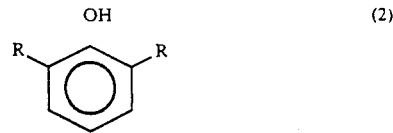

to produce a silicone-polyphenylene ether graft copolymer, where R is selected from a halogen radical, or the same or different $C_{(1-13)}$ monovalent organic radicals, $R^1$ is a $C_{(2-20)}$ divalent organic radical, $R^2$ is selected from the same or different $C_{(1-13)}$ monovalent organic radicals, $R^3$ is a $C_{(1-13)}$ monovalent organic radical and n is an integer equal to 1 to 100 inclusive. It has been found that the silicone-polyphenylene ether graft copolymer exhibits outstanding flame retardance and can be employed as a high performance injection moldable thermoplastic.

STATEMENT OF THE INVENTION

There is provided by the present invention, a flame retardant silicone-polyphenylene ether graft copolymer comprising the oxidative coupling product of reaction of 20 to 1000 mols of a 2,6-diorganophenol of formula 2, per mol of a phenol-siloxane macromer of formula 1.

Radicals included within R of formulas 1 and 2 are, for example, halogen, such as chloro or bromo, $C_{(1-8)}$ alkyl radicals, such as, methyl, ethyl, propyl and butyl; aryl radicals, such as, phenyl, tolyl, xylyl; haloaryl radicals, such as, chlorophenyl. Radicals included within $R^1$ are, for example, $C_{(2-20)}$ polyalkylene, such as polymethylene, and arylenealkylene, such as phenylenemethylene. Radicals included within $R^2$, are the same or different radicals included within R. In addition, $R^2$ can be selected from trifluoropropyl, cyanoethyl and cyanopropyl. Radicals included within $R^3$ are, for example $C_{(1-8)}$ alkyl such as methyl ethyl, propyl and butyl and $C_{(6-13)}$ aryl, such as phenyl, tolyl, and xylyl.

The phenol-siloxane macromer of formula 1, can be made by effecting a hydrosilylation addition reaction between an aliphatically unsaturated phenol having the formula,

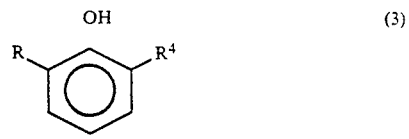

and a hydride terminated polydiorganosiloxane having the formula,

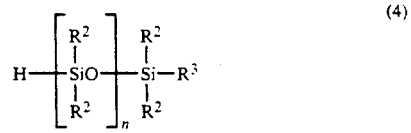

where R, $R^2$, $R^3$ and n are as previously defined and $R^4$ is an aliphatically unsaturated $C_{(2-20)}$ organic radical. The addition between the aliphatically unsaturated phenol of formula 3, and the silicone hydride of formula 4 can be effected with an effective amount of a platinum group metal catalyst, such as platinum.

The silicone hydride of formula 4 can be made by initially lithiating a cyclic diorganosiloxane, such as hexamethyltrisiloxane, with an organolithium compound, for example, butyllithium or phenyllithium. The silicone block length can vary depending upon the moles of the cyclic hexaorganotrisiloxane, per mol of the organolithium compound used. There has been found, for example, that substantially equal molar amounts of the cyclic trisiloxane and the organolithium compound will provide for a block length of from about 7 to 13, while a higher proportion of the cyclic trisiloxane will proportionally increase the resulting polydiorganosiloxane block length. The initial polymerization of the cyclic trisiloxane is conducted under anhydrous conditions and under a nitrogen atmosphere. After the polydiorganosiloxane has been formed having a terminal lithium ion and an organo radical, a diorganohalosilane can be added to produce the silicone hydride of formula 4.

In addition to hexaorganocyclotrisiloxane "trimer", octamethylcyclotetrasiloxane, or "tetramer" can be used to make the silicone macromer. Tetramer can be equilibrated in the presence of an acid catalyst with a hydride chainstopper, such as a tetraorganodisiloxane or a pentaorganodisiloxane to produce polydiorganosiloxane having from 1 to 100 condensed diorganosiloxy units. If the chainstopper is a tetraorganodisiloxane, a polydiorganosiloxane will be formed having terminal diorganohydridesiloxy units. However, if the pentaorganodisiloxane is used, a polydiorganosiloxane mixture can be formed consisting of polydiorganosiloxane having terminal diorganohydridesiloxy units, polydiorganosiloxane terminated with a diorganohydridesiloxy unit and a triorganosiloxy unit and polydiorganosiloxane having terminal triorganosiloxy units. Hydrosilylation with the aliphatically unsaturated phenol of formula (3), can produce a phenolsiloxane macromer similiar to formula (1), if the polydiorganosiloxane is terminated with only one diorganohydridesiloxy unit. However, in instances where the polydiorganosiloxane has terminal diorganohydridesiloxy units, a phenol-siloxane macromer having the formula

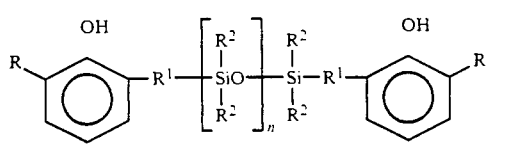

can be formed, where R, R$^1$, R$^2$ and n are as previously defined.

It has been found that phenol terminated polydiorganosiloxane of formula (5), where n is 10 to 100 can be oxidatively coupled with 2,6-diorganophenol of formula (2) to produce flame retardant thermoplastic injection moldable graft copolymers, if there is used from 0.1 mole to 1 mole of the phenol terminated polydiorganosiloxane, per 100 moles of the 2,6-diorganophenol.

It is preferred however to use a macromer of formula (5) having n equal to 10 to 30 and from 0.1 to 0.5 mol of macromer, per 100 moles of 2,6-diorganophenol for optimum results. In instances where the oxidative coupling is effected with macromer outside of the aforementioned ranges, excessive cross-linking leading to gellation of the graft copolymer can occur.

Monohydric phenols, which are included within formula 2 are, for example, 2,6-dimethylphenol, 2,6-methylphenylphenol, 2,6-diphenylphenol, and 2,6-di-t-butylphenol, and 2,6-dibromophenol Aliphatically unsaturated monohydric phenols, which are included within formula 3, are, for example, 2-methyl-6-allylphenol, 2-phenyl-6-allylphenol, 2-bromo-6-allylphenol, 2-t-butoxy-6-allylphenol, 2-phenyl-6-ethenylphenol, and 2-methyl-6-propargylphenol.

The preferred silicone-polyphenylene ether graft copolymer, hereinafter referred to as the "graft copolymer" can be made by oxidatively coupling the 2,6-diorganophenol of formula 2, with the silicone macromer of formula 1. In instances where tetramer is used to form the graft copolymer, it is necessary to operate within the aforementioned limits to avoid excess cross-linking.

The preferred oxidative coupling catalyst which can be used is an amine-basic cupric salt complex is shown by Hay, U.S. Pat. No. 3,306,874, in column 4, lines 38–61, and incorporated herein by reference. Effective oxidative coupling results also can be achieved with manganese and cobalt catalysts in addition to copper salts. Cuprous fluoride or cuprous bromide are the preferred copper salts. Typical of the primary and secondary amines which can be used in making the catalyst is shown in column 4, lines 62-75, and column 5, lines 1-55, of U.S. Pat. No. 3,306,874, which are incorporated herein by reference. However, dimethylbutylamine, dibutylamine and dibutylethylenediamine are examples of the preferred amines which can be used in forming the catalyst.

The graft copolymers of the present invention can be used as flame retardant high performance thermoplastics. It also has been found that the graft copolymers of the present invention can exhibit identical melt viscosities with Noryl resin which is a blend of polyphenylene ether and polystyrene. In addition, the graft copolymer of the present invention can satisfy UL94 V0 requirements when tested at 1/16", depending upon the mol % of the silicone macromer in the graft as compared to the mols of condensed arylene oxide resulting from the oxidative coupling of the monohydric phenol of formula 2.

Additional considerations include the silicone block length of the macromer which can contribute to an overall weight % value of silicone in the silicone macromer as well as in the graft copolymer. Optimum flame retardant properties with respect to a V0 rating, for example, can be achieved with the graft copolymer when there is employed a proportion of about 20 to 1000 mols of monohydric phenol, per mol of the silicone macromer during oxidative coupling. In addition to exhibiting a V0 value, in accordance with the UL94 test, the graft copolymer of the present invention also can provide about a 30% by weight of residue upon termination of burning. This residue is sometimes referred to as "char yield". Char yield can be measured by burning a 1.5×0.5×1/16 inch molded sample of polymer placed 2" from a radiant heat panel having 3.5 Watts/cm$^2$ heat flux. In addition to "char yield", the char itself can be dense or "puffy" which can further enhance the value of the precursor as a flame retardant thermoplastic in particular applications. In addition, there can be added to the graft copolymer, various materials, such as, plasticizers, pigments and flame retardant additives.

The silicone macromer of formula 1 also can be used as a surfactant to facilitate the blending of organic and silicone materials under aqueous conditions. The silicone macromer also can be employed as a compatiblizer, or plasticizer for blends of silicone with other aromatic organic thermoplastic polymers.

EXAMPLE 1

A solution of 32.3 grams (145 m mol) of sublimed hexamethylcyclotrisiloxane ($D_3$) and 45 ml of freshly distilled cyclohexane was stirred under substantially anhydrous conditions. After solvation of the $D_3$ was completed, there was injected into the mixture, 27.6 ml of sec-butyllithium (1.35 M in cyclohexane, 37.3 mmol). After one hour, 25 ml of THF was added. The resulting cloudy solution was left to stir for about 24 hours. There was then added, 4.28 ml (39.3 mmol) of dimethylchlorosilane and the resulting white slurry was stirred for an additional hour. Excess dimethylchlorosilane was neutralized by adding 50 mg of dry sodium bicarbonate in 1 ml of absolute ethanol. The resulting slurry was then stirred for an additional ½ hour. An additional 50 ml of dry cyclohexane was added to fully precipitate lithium chloride which was thereafter removed by filtration. Solvent was removed by a rotary evaporator resulting in the production of 35 grams of a clear viscous product (96% mass conversion). Based on method of preparation, GC analysis and NMR analysis, the product was $\alpha$-hydro-$\omega$-sec-butyl-polydimethylsiloxane having an average of about 13 condensed dimethylsiloxy units.

There was added, 5 ul (50 ug/ul, 40 ppm) of a platinum catalyst shown in Karstedt, U.S. Pat. No. 3,775,452 to a stirred mixture of 1.6 grams (10.8 mmol) of 2-allyl-6-methylphenol and 9.40 grams (9.4 mmol) of $\alpha$-hydro-$\omega$-sec-butyl-polydimethylsiloxane. The hydrosilation was nearly complete within 1 hour as shown by GC and the mixture was warmed gently to 40° C. After stirring the mixture under nitrogen at 40° C. for an additional 4 hours, the volatile components were removed from the mixture by heating to 110° C. at 1.5 torr. Based on method of preparation and $^1$H-NMR, there was obtained 10.5 g of methylphenolsilicone macromer having polydimethylsiloxane blocks with an average of about 13 condensed dimethylsiloxy units.

EXAMPLE 2

The procedure of example 1 was repeated, except that 20 micro liters (26 ppm) of the platinum catalyst was added to 10 grams (68 mmol) of 2-allyl-6-methylphenol which was being stirred at 40° C. There was then added slowly, 10.5 grams (71 mmol) of pentamethyldisiloxane. GC indicated that the reaction was nearly complete after 10 minutes. The mixture was vacuum distilled and there was recovered, 15.8 grams (78%) of product. Based on method of preparation and $^1$H-NMR, the product was a silicone macromer in the form of a 2-allyl-6-methylphenol pentamethyldisiloxane.

EXAMPLE 3

A mixture of 2.5 gram (20.5 mmol) of 2,6-xylenol, 60 ml of toluene, 1.23 ml of dimethylbutylamine, 0.25 ml of Adogen 464, a methyltrialkylammonium chloride surfactant of the Aldrich Chemical Co., Milwaulkee, Wis. (10% in toluene), 0.32 ml of dibutylamine, and 8 drops of dibutylethylenediamine was rapidly stirred, while at least 0.5 mol per hour of oxygen was bubbled through the solution. There was then added, 0.14 ml of a cuprous bromide solution (48% aqueous hydrogen bromide) and the temperature of the resulting mixture was kept below 40° C. using external cooling. When the temperature reached 35° C., a solution of 21.3 grams (175 mmol) of 2,6-xylenol, 10.2 grams (8.9 mmol) of the siloxane macromer of Example 1, and 70 ml of toluene was added to the reaction mixture over a 20 minute period. The temperature of the mixture was maintained at 38°–40° C. with external cooling. After the addition was complete, the temperature was maintained at 38°–40° C. The mixture was continuously agitated for another 90 minutes until a thick viscosity was attained. The mixture was then cooled to 30° C. There was added 5 ml of glacial acetic acid to deactivate the catalyst and the resulting solution was mixed another 5 minutes before being diluted with 100 ml of toluene. There was then added, 300 ml of methanol to the resulting solution while it was stirred. A product precipitated which was collected in a Buchner funnel. The product was then reprecipitated from a toluene/methanol mixture. There was obtained 30.0 grams of a product representing an 88% mass conversion. Based on method of preparation and GPC, the product was an injection moldable polyphenylene ether-siloxane graft copolymer having an $M_w$ of 69,700, $M_n$ of 22,900, and a D=3.0; its Tg as measured by DSC was 145° C. $^1$H-NMR showed a 3.9% incorporation the silicone macromer resulting in a product having of 24% by weight of polydimethylsiloxane and a 96.1 mol% of the oxidatively coupled 2,6-xylenol. The same oxidative coupling procedure was repeated with the pentamethyldisiloxane allyl phenol macromer utilizing 5.93 grams (20 mml) of the silicone macromer and 22 grams (180 mmol) of the xylenol. The product was a polyphenylene ether silicone graft copolymer, $M_w = 109,200$, $M_n = 23,400$, and D=4.66. Its intrinsic viscosity was 0.42 and its Tg was 169° C.

EXAMPLE 4

1/16th inch compression molded test bars of the graft copolymers of Example 3 were molded at 250° C. for 1.5 minutes under 2 tons of pressure. The test bars were tested in accordance with the procedure of the UL-94 test. A 1 gram molded sample, roughly 1.5×0.5×1/16 inch, was placed 2 inches from a radiant heat panel. The following results were obtained where PPO resin is a polyphenylene ether resin manufactured by GE, "graft (2)" is the graft copolymer within the scope of formula 1 where n is equal to one, "graft (13)" is the graft copolymer within the scope of formula 1 where n is equal to twelve, "Noryl resin A" is a blend of PPO resin and high impact polystyrene, and "Noryl resin B" is a blend of about 50% by weight of polyphenylene ether and crystalline polystyrene, "IV" is intrinsic viscosity, "OI" is oxygen index, "FO" indicates average flame-out time in seconds, "Char Y" indicates weight % of residue after burning based on the original weight of polymer, and "Char V" shows the physical structure of the char.

|  | Mn | Mw | IV | OI | FO* | Char Y | Char V | MV** | Tg |
|---|---|---|---|---|---|---|---|---|---|
| PPO Resin | 20000 | 50000 | 0.46 | 30 | 8–10 | 29 | small | *** | 215 |
| Graft (2) | 23400 | 109200 | 0.42 | — | 5.3 | 27.2 | small | 0.61 | 169 |
| Graft (13) | 22900 | 69700 | 0.43 | 35.7 | 1.4 | 28.6 | puffy | 0.53 | 145 |
| Noryl Resin A | — | — | — | — | 5 | — | small | 0.50 | 110 |

-continued

|  | Mn | Mw | IV | OI | FO* | Char Y | Char Y | MV** | Tg |
|---|---|---|---|---|---|---|---|---|---|
| Noryl Resin B | — | — | — | 20 | burns | 17 | small | 1.10 | 145 |

*1/16" bars compression molded at 250° C. for 1.5 min at 2 tons pressure: flame-out time in seconds.
**Melt viscosity (> 10⁵ poise) measured at 250° C. at 1 rad/sec on a rotating dynamic spectrometer.
***Cannot be measured at this temperature The above results show that a significant improvement in flame-out time is achieved with the graft copolymer of the present invention having a higher proportion of chemically combined polydimethylsiloxane. In addition, the structure of the char changed from a relatively dense material to a puffy material.

EXAMPLE 5

A mixture of 75 grams of octamethylcyclotetrasiloxane (D4), 9.4 grams of pentamethyldisiloxane, and 0.85 grams of Filtrol 20, an acid clay, made by Filtrol Clay Products of Cleveland, Ohio, was heated with stirring at 80° C. for 3½ hours under nitrogen. The mixture was allowed to cool to room temperature and diluted with 100 ml of hexane. The Filtrol 20 was then removed by filtration. Hexane was removed by a rotary evaporator to give 82.3 grams of a polydimethylsiloxane mixture consisting of dimethylhydridesiloxy terminated polydimethylsiloxane, polydimethylsiloxane having dimethylhydridesiloxy and trimethylsiloxy termination, trimethylsiloxy terminated polydimethylsiloxane and cyclopolydimethylsiloxane.

There was added 9.4 grams of 2-allyl-6-methylphenol to the above polydimethylsiloxane mixture along with 130 mg of platinum on activated carbon. The resulting mixture was heated to 50° C. with stirring for 1.25 hours. ¹H-NMR indicated that hydrosilylation was completed. The mixture was allowed to cool to room temperature and diluted with 50 ml of hexane. The mixture was then filtered and hexane was removed using a rotary evaporator. Vacuum distillation at 0.75 torr resulted in 79.6 grams of a silicone macromer mixture having an average dimethylsiloxane chain length of about 18.3.

The procedure of Example 3 was repeated utilizing 4.5 grams of the above macromer mixture and 54.62 grams of the 2,6-xylenol. There was obtained an injection moldable graft copolymer having an $M_n$ of 57,500, and $M_w$ of 710,260 and D of 12.4. The graft copolymer had a flame-out time of 1.3 seconds when tested in accordance with UL94.

Although the above examples are directed to only a few of the very many variables which can be used in the practice of the present invention, it should be understood that the present invention is directed to a much broader variety of silicone macromers, graft copolymers and method for making such materials as set forth in the description preceding these examples.

What is claimed is:

1. A method for making a thermoplastic silicone-polyphenylene ether graft copolymer comprising oxidatively coupling a 2,6-disubstituted phenol of the formula,

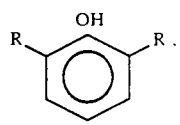

with a phenol-siloxane macromer selected from,

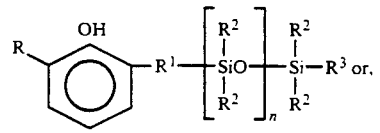

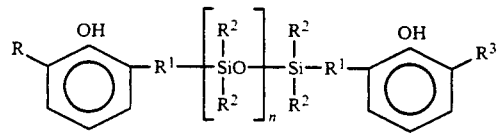

where R is selected from a halogen radical, or the same or different $C_{(1-13)}$ monovalent organic radicals, $R^1$ is a $C_{(2-20)}$ divalent organic radical, $R^2$ is selected from the same or different $C_{(1-13)}$ monovalent organic radicals, $R^3$ is a $C_{(1-13)}$ monovalent organic radical and n is an integer equal to 1 to 100 inclusive.

2. A flame retardant thermoplastic silicone-polyphenylene ether graft copolymer comprising the oxidative coupling product of reaction of 20 to 1000 mols of a 2,6-disubstituted phenol of the formula,

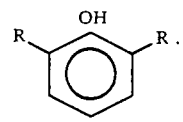

per mol of a phenol-siloxane macromer of the formula,

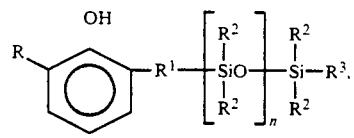

where R is selected from a halogen radical, or the same or different $C_{(1-13)}$ monovalent organic radicals, $R^1$ is a $C_{(2-20)}$ divalent organic radical, selected from the group consisting of alkylene and arylene alkylene, $R^2$ is selected from the same or different $C_{(1-13)}$ monovalent organic radicals, $R^3$ is a $C_{(1-13)}$ monovalent organic radical and n is an integer equal to 1 to 100 inclusive.

3. Flame retardant silicone-polyphenylene ether graft copolymer in accordance with claim 2, where the 2,6-disubstituted phenol is, 2,6-xylenol.

4. Flame retardant silicone-polyphenylene ether graft copolymer in accordance with claim 2, where $R^2$ is methyl.

5. A flame retardant thermoplastic silicone-polyphenylene ether graft copolymer, comprising the oxidative coupling product of reaction of a phenol-siloxane macromer of the formula,

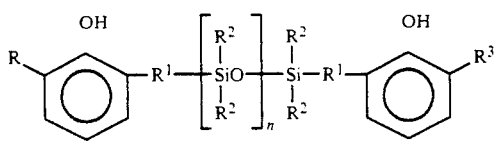

and a 2,6-di substituted phenol of the formula,

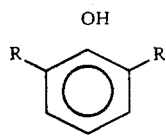

where R is selected from a halogen radical, or the same or different $C_{(1-13)}$ monovalent organic radicals, $R^1$ is a $C_{(2-20)}$ divalent organic radical, $R^2$ is selected from the same or different $C_{(1-13)}$ monovalent organic radicals, $R^3$ is a $C_{(1-13)}$ monovalent organic radical and n is an integer equal to 1 to 100 inclusive.

6. A thermoplastic flame retardant silicone-polyphenylene ether graft copolymer in accordance with claim 10, where the phenol-siloxane macromer has the formula,

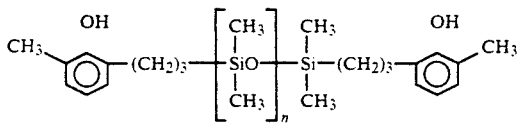

n has a value of 10 to 30 and the 2,6-diorganophenol is 2,6-xylenol.

* * * * *